US005702509A

United States Patent [19]

Pellerite et al.

[11] Patent Number: 5,702,509
[45] Date of Patent: Dec. 30, 1997

[54] MASONRY TREATMENT COMPOSITION

[75] Inventors: Mark J. Pellerite, Woodbury; Larry D. Rich, Oakdale, both of Minn.; James F. Sanders, St. Joseph Township, Wis.

[73] Assignee: Minnesota Mining and Manufacturing Company, St. Paul, Minn.

[21] Appl. No.: 577,643

[22] Filed: Dec. 22, 1995

[51] Int. Cl.$^6$ .......................... C09D 5/00; C09D 183/08; C09D 183/07; C09D 183/06
[52] U.S. Cl. .......................... 106/2; 106/287.19; 524/873
[58] Field of Search .................. 106/287.19; 524/873; 136/2

[56] References Cited

U.S. PATENT DOCUMENTS

| 4,661,551 | 4/1987 | Mayer et al. | 524/379 |
|---|---|---|---|
| 5,205,860 | 4/1993 | Narula et al. | 106/2 |
| 5,250,106 | 10/1993 | Roth et al. | 106/2 |
| 5,274,159 | 12/1993 | Pellerite et al. | 556/485 |
| 5,399,191 | 3/1995 | Mayer et al. | 106/287.11 |
| 5,442,011 | 8/1995 | Halling | 524/873 |
| 5,527,931 | 6/1996 | Rich et al. | 556/413 |

FOREIGN PATENT DOCUMENTS

| 0 561 708 A2 | 9/1993 | European Pat. Off. . |
|---|---|---|
| 0 694 551 A1 | 1/1996 | European Pat. Off. . |

OTHER PUBLICATIONS

R. H. Baney et al., "Silsesquioxanes," Chem. Rev. 95, 1409–1430 (1995) no month avail.

CA 118:255974 Watanabe et al., "Spherical micro particles of silicones containing organic groups" Jul. 23, 1992.

*Primary Examiner*—David Brunsman
*Attorney, Agent, or Firm*—Gary L. Griswold; Walter N. Kirn; Lucy C. Weiss

[57] ABSTRACT

A self-emulsifying, liquid treatment composition comprises the polysiloxane reaction product of (a) at least one alkoxysilane, alkoxysiloxane, or siloxane compound comprising at least one hydrophobic moiety selected from the group consisting of alkyl, aryl, aralkyl, and alkaryl moieties; (b) at least one alkoxysilane, alkoxysiloxane, or siloxane compound comprising at least one hydrophilic moiety selected from the group consisting of protonated and unprotonated azaalkyl and silyl-containing azaalkyl moieties; and (c) at least one fluorine-containing alkoxysilane compound which is capable of reaction with component (a) and/or component (b) and which comprises at least one perfluoroalkyl group having at least four carbon atoms and optionally containing one or more catenary ether oxygen atoms. The composition can be used to render substrates, especially porous substrates (e.g., concrete, wood, or masonry), both water- and oil-repellent.

22 Claims, No Drawings

MASONRY TREATMENT COMPOSITION

FIELD OF THE INVENTION

This invention relates to compositions for treating substrates to render them repellent to water-and oil-based challenges. In other aspects, this invention also relates to aqueous dispersions of the compositions, to solvent dispersions or solutions of the compositions, to articles coated with the compositions or the dispersions, and to a process for protecting substrates.

BACKGROUND OF THE INVENTION

Porous substrates (including concrete, masonry and wood structures) are vulnerable to the general effects of weathering and, specifically, to exposure to water and oil. The weathering of concrete substantially shortens the useful life of structures such as highways, bridges, parking ramps, and the like. Exposure of wood and masonry substrates to water and oil can also significantly shorten the useful life of the product and reduce its aesthetic appeal even before it is no longer functional. Such substrates are often sealed with a film-forming resin, such as an epoxy or urethane product. These coating materials may undesirably alter the appearance of the coated substrate. Such coatings also seal the product completely, preventing or greatly reducing the escape of moisture from the coated substrate.

Silane and siloxane compositions are commercially available to seal both wood and masonry substrates to provide protection against water damage. Such compositions are typically delivered from volatile organic solvents and are thus undesirable because of the adverse effects of the solvents upon the atmosphere and the resultant health problems associated with air pollution.

A number of water-dispersed or water-emulsified silane treatments have been developed in response to such environmental and health concerns. While providing ecological advantages over solvent-based treatments, these water-based compositions have not been able to provide performance characteristics comparable to those of solvent-delivered materials. For example, the water-based compositions may not exhibit oil-repelling properties, and many of the compositions exhibit poor substrate penetration. Water-based emulsions comprising fluorine-containing silane compounds have been developed to impart a degree of oil repellency to substrates, but many of these emulsions exhibit only limited stability with respect to phase separation. This can be a disadvantage during use if application must be interrupted to re-agitate the emulsion. Some of these compositions also require the addition of external surfactant (which can detrimentally affect initial repellency properties) to achieve emulsion stability.

Thus, there currently exists a need for water-based compositions which provide a satisfactory balance of water and oil repellency on porous substrates, which exhibit performance characteristics comparable to those of solvent-based compositions, and which exhibit long-term stability. Preferably, such compositions will also be self-emulsifying and thereby capable of providing emulsions having persistent translucence (which can serve as an indicator of mixture homogeneity and stability).

SUMMARY OF THE INVENTION

Briefly, in one aspect, this invention provides a self-emulsifying, liquid treatment composition for rendering substrates (especially porous substrates, e.g., concrete, wood, or masonry) both water- and oil-repellent. The composition comprises the polysiloxane reaction product of (a) at least one alkoxysilane, alkoxysiloxane, or siloxane compound comprising at least one hydrophobic moiety selected from the group consisting of alkyl, aryl, aralkyl, and alkaryl moieties; (b) at least one alkoxysilane, alkoxysiloxane, or siloxane compound comprising at least one hydrophilic moiety selected from the group consisting of protonated and unprotonated azaalkyl and silyl-containing azaalkyl moieties; and (c) at least one fluorine-containing alkoxysilane compound which is capable of reaction with component (a) and/or component (b) and which comprises at least one perfluoroalkyl group having at least four carbon atoms and optionally containing one or more catenary (i.e., in-chain and bonded only to carbon) ether oxygen atoms (so as to constitute a perfluoroether group). Components (a) and (b) can be replaced with at least one alkoxysilane, alkoxysiloxane, or siloxane compound comprising at least one of the hydrophobic moieties and at least one of the hydrophilic moieties (hereinafter, component (ab)). (In other words, a single compound can function both as component (a) and as component (b), provided that the compound comprises both the hydrophobic and the hydrophilic moieties.) The fluorine-containing alkoxysilane compound preferably further comprises at least one heteroatom selected from the group consisting of nitrogen, oxygen, and sulfur (more preferably, nitrogen or sulfur).

The composition of the invention comprises hydrophilic, hydrophobic, and oleophobic moieties and thereby provides a satisfactory balance of both water-and oil-based repellency properties on porous substrates. The composition can be delivered as a neat material or in the form of either a solvent dispersion or solution or, importantly, an aqueous dispersion. The composition of the invention is self-emulsifying and thereby eliminates the need for separate surfactant (which can detrimentally affect initial repellency properties).

Surprisingly, aqueous dispersions of the self-emulsifying composition are stable, translucent emulsions or microemulsions which show little or no phase separation or precipitation after storage without agitation for periods of, e.g., several days at room temperature. When applied to a porous substrate and allowed to dry and cure at room temperature, the emulsions only minimally affect substrate appearance, imparting little or no gloss and exhibiting penetration depths of, e.g., 0.5 millimeter or more, depending upon the nature of the substrate. Thus, the emulsions exhibit performance characteristics comparable to those of solvent-based compositions, while eliminating many of the adverse ecological impacts associated with solvent-based systems.

In other aspects, this invention further provides both aqueous dispersions and solvent dispersions or solutions of the composition of the invention, articles (including extensive concrete or masonry substrates) coated with the composition or the dispersions, and a process for protecting substrates from water- and oil-based challenges.

DETAILED DESCRIPTION OF THE INVENTION

Hydrophobic moiety-containing compounds suitable for use in preparing the composition of the invention (as component (a)) are those alkoxysilane, alkoxysiloxane, or siloxane compounds which comprise at least one hydrophobic moiety selected from the group consisting of alkyl, aryl, aralkyl, and alkaryl moieties. Preferably, the hydrophobic moiety is selected from the group consisting of alkyl groups having from 1 to about 12 carbon atoms (more preferably, from 1 to about 8), phenyl, benzyl, phenethyl, and alkylphenyl.

A class of hydrophobic moiety-containing compounds useful in preparing the composition of the invention is that which can be represented by the following average general formula:

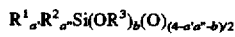

wherein each $R^1$ is independently an alkyl group having from 1 to about 12 carbon atoms (preferably from 1 to about 8 carbon atoms); each $R^2$ is independently an alkyl group having from 1 to about 4 carbon atoms; each $R^3$ is independently selected from the group consisting of hydrogen and alkyl groups having from 1 to about 4 carbon atoms; a' and a" are independently integers of 0, 1, or 2, with the proviso that the sum of a' and a" is equal to 1 or 2; b is a number from 0 to about 3; and the sum of a', a", and b is less than or equal to 4. Preferably, $R^2$ and $R^3$ are independently selected from the group consisting of methyl and ethyl (more preferably, methyl). Such compounds can be prepared by the partial hydrolysis and condensation of commercially available alkoxysilanes $(R^1_{a'R}{}^2_{a''}Si(OR^2)_{4-a'-a''})$ and mixtures thereof. These mixtures can also include tetraalkoxysilanes $(Si(OR^2)_4)$.

Representative examples of hydrophobic moiety-containing compounds suitable for use in preparing the composition of the invention include methyltrimethoxysilane, dimethyldiethoxysilane, phenyltrimethoxysilane, isobutyltrimethoxysilane, octyltriethoxysilane, and isooctyltrimethoxysilane, partial hydrolyzates and condensates thereof, and mixtures thereof. Preferred compounds include methyltrimethoxysilane, isobutyltrimethoxysilane, isooctyltrimethoxysilane, and partial condensates thereof (which can be prepared by the methods described by, e.g., R. H. Baney et al. in Chem. Rev. 95, 1409 (1995)).

Hydrophilic moiety-containing compounds suitable for use in preparing the composition of the invention (as component (b)) are those alkoxysilane, alkoxysiloxane, or siloxane compounds which comprise at least one hydrophilic moiety selected from the group consisting of protonated and unprotonated azaalkyl (nitrogen-containing alkyl) and silyl-containing azaalkyl moieties. Preferably, the hydrophilic moiety is selected from the group consisting of protonated and unprotonated mono- and diazaalkyl groups (more preferably, diazaalkyl) having from about 3 to about 12 (more preferably, from about 3 to about 5) carbon atoms. Protonated groups are generally preferred because of their greater hydrophilicity and thereby greater efficiency as water-compatibilizing groups. Protonation can be effected by the use of acids such as mineral acids (e.g., hydrochloric acid and sulfuric acid) and carboxylic acids (e.g., acetic acid and propionic acid). Preferably, carboxylic acids are utilized (more preferably, low molecular weight, volatile carboxylic acids; most preferably, acetic acid).

A class of hydrophilic moiety-containing compounds useful in preparing the composition of the invention is that which can be represented by the following average general formula:

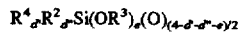

wherein each $R^4$ is independently a protonated or unprotonated (preferably, protonated) azaalkyl or silyl-containing azaalkyl group having from about 3 to about 12 (preferably, from about 3 to about 5) carbon atoms (preferably, a mono- or diazaalkyl group; more preferably, diazaalkyl); d' is an integer of 1 or 2; d" is an integer of 0 or 1; e is a number from 0 to about 3; the sum of d' and d" is equal to 1 or 2; the sum of d', d", and e is less than or equal to 4; and and $R^3$ are as defined above. Preferably, d' is 1 and d" is 0. Such compounds can be prepared by the partial hydrolysis and condensation of commercially available alkoxysilanes $(R^4_{d'}R^2_{d''}Si(OR^2)_{4-d'-d''})$ and mixtures thereof.

Representative examples of hydrophilic moiety-containing compounds suitable for use in preparing the composition of the invention include 3-(methylamino)propyltrimethoxysilane, (3-aminopropyl)methyldimethoxysilane, 3-aminopropyltrimethoxysilane, N-[2-aminoethyl]-3-aminopropyltrimethoxysilane, bis(3-trimethoxysilylpropyl)amine, partial condensates thereof, and mixtures thereof. Preferred compounds include 3-aminopropyltrimethoxysilane, N-[2-aminoethyl]-3-aminopropyltrimethoxysilane, and their partial condensates.

Alkoxysilane, alkoxysiloxane, and siloxane compounds which comprise both hydrophobic and hydrophilic moieties are also useful in preparing the composition of the invention. A class of such compounds is that which can be represented by the following average general formula:

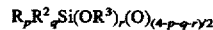

wherein each R is independently selected from the group consisting of $R^1$ and $R^4$, wherein $R^1$ and $R^4$ are as defined above; $R^2$ and $R^3$ are as defined above; p is an integer of 1 or 2; q is an integer of 0 or 1; r is a number from 0 to about 3; and the sum of p, q, and r is less than or equal to 4. Such compounds can be prepared by the partial hydrolysis and condensation of commercially available alkoxysilanes $(R_pR^2_qSi(OR^2)_{4-p-q})$ and mixtures thereof.

Representative examples of such compounds include Dow Corning's DC1-6184 and the Wacker products Veoceal™ VP2100, Veoceal™ VP1311, and AMS-50, as well as the organopolysiloxane materials described in U.S. Pat. Nos. 4,661,551 (Mayer et al.), 5,250,106 (Roth et al.), and 5,205,860 (Narula et al.).

Fluorine-containing alkoxysilane compounds suitable for use in preparing the composition of the invention are those which are capable of reaction with component (a) and/or component (b) and which comprise at least one perfluoroalkyl group having at least four carbon atoms (preferably, from about 6 to about 16 carbon atoms; more preferably, from about 6 to about 10 carbon atoms) and optionally containing one or more catenary ether oxygen atoms. The fluorine-containing alkoxysilane compounds preferably further comprise at least one heteroatom selected from the group consisting of nitrogen, oxygen, and sulfur (more preferably, nitrogen or sulfur).

A class of fluorine-containing alkoxysilane compounds useful in preparing the composition of the invention is that which can be represented by the following average general formula:

wherein each $R_f$ is independently a perfluoroalkyl group having at least four carbon atoms (preferably, from about 6 to about 16 carbon atoms; more preferably, from about 6 to about 10 carbon atoms) and optionally containing one or more catenary ether oxygen atoms; each $R^5$ is independently selected from the group consisting of alkylene groups having from 2 to about 11 (preferably, from 2 to about 5) carbon atoms, arylene groups having from 6 to about 10 carbon atoms, and alkarylene groups having from 7 to about 16 carbon atoms; $R^2$ is as defined above; h' is an integer of 1 or 2; h" is an integer of 0 or 1; the sum of h' and h" is less than or equal to 2; and each Z is independently a divalent moiety selected from the group consisting of a covalent bond, $-(CH_2)_nS-$, $-(CH_2)_{n+1}NR^2-$, $-(CH_2)_nSO_2NR^3-$, $-(CH_2)_nC(=O)NR^3-$, $-(CH_2)_nSO_2NR^2CH_2CH_2O(C=O)CH_2CH_2NR^3-$, and $-(CH_2)_nO-$ (preferably, $-(CH_2)_nSO_2NR^3-$ or $-(CH_2)_nC(=O)NR^3-$), where n is an integer of 0 to about 5, n' is an integer of 1 to about 5 and $R^2$ and $R^3$ are as defined above. Preferably, h' is 1 and h" is 0. Such compounds can be prepared by the methods described in, e.g., U.S. Pat. No. 5,274,159 (Pellerite et al.), the descriptions of which are incorporated herein by reference.

Representative examples of fluorine-containing alkoxysilane compounds suitable for use in preparing the composition of the invention include

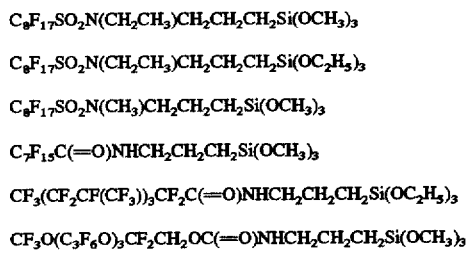

Preferred Compounds include N-(3-trimethoxysilylpropyl)-N-ethyl-perfluorooctanesulfonamide and N-(3-trimethoxysilylpropyl)perfluorooctanecarboxamide.

The treatment composition of the invention can be prepared by combining components (a), (b), and (c) (or component (ab) and component (c)). Such components can be combined in any order and in any manner of subcombination.

In any case, the components generally condense (i.e., react) within time periods of, e.g., from about 2 to about 24 (preferably, 8) hours, to form oligomeric condensation products. (If condensation is partial, the condensation products will necessarily coexist with any unreacted component(s). Preferably, at least some unreacted component (c) is present in the composition.) When components (a) and (b) are both monomeric alkoxysilanes, water is typically added to the composition to effect partial hydrolysis and condensation, as described, e.g., in U.S. Pat. No. 5,442,011 (Hailing). A class of such condensation products can be represented by the following average general formula:

wherein $R_f'$ is $R_f-Z-R^5-$, where $R_f$, Z, and $R^5$ are as defined above; and $R^1$, $R^2$, $R^3$, $R^4$, a', a", b, d', d", e, h', and h" are as defined above; i is a number from 0 to about 3; and c, g, and j are independently numbers from about 1 to about 50, with the proviso that (c+j)/g is greater than 1 (preferably, from 1.2 to about 150) and that c/j can range from 1 to about 10; wherein the sums a'+a"+b, d'+d"+e, and h'+h"+i are each less than or equal to 3, and wherein the average number of alkoxy groups ($OR^3$) per silicon atom is between about 0.5 and about 2.5, preferably, between about 0.8 and about 1.7 (averaged over the entire composition). Optionally, up to about 10 mole percent of the silicon in the above structural formula can be present as units where a'=a"=0.

The relative amounts of components (a), (b), and (c) (or components (ab) and (c)) can vary over a wide range, depending upon the nature of the hydrophobic and hydrophilic moieties. In general, however, the fluorine content of the composition preferably ranges from about 5 to about 30 weight percent, more preferably, from about 10 to about 25 weight percent, most preferably, from about 15 to about 25 weight percent. Preferably, a stoichiometric excess of component (c) is used, as the presence of some unreacted component (c) has been found to enhance the stain resistance performance of the composition. Other monomeric alkoxysilanes can also be present.

The treatment composition of the invention can be applied to a substrate in any desired manner, e.g., by brushing, spraying, pouring, rolling, or dipping. The composition can be delivered as a neat material or in the form of either a solvent dispersion or, preferably, an aqueous dispersion. Dispersions of the composition can preferably be prepared by adding solvent(s) or water to the composition (or vice versa). Generally, concentrations (of composition in water or solvent) ranging from about 1 to about 20 weight percent are useful (preferably, from about 10 to about 20 weight percent), but other concentrations can be utilized for particular purposes, if desired. Mixtures of water and solvent(s) (preferably, water-miscible solvent(s)) can also be utilized. Suitable solvents include lower alcohols (e.g., methanol or ethanol), ketones (e.g., acetone or methyl ethyl ketone), esters (e.g., ethyl acetate), ethers (e.g., tetrahydrofuran or glycol ethers), and the like. The resulting combinations can then be stirred or shaken, if desired, to facilitate mixing. The composition of the invention is self-emulsifying in water and thus separate surfactant (which can detrimentally affect initial repellency properties) is not required. Occasionally, difficulties in re-wetting previously treated surfaces may be encountered. In such cases, limited quantities of separate surfactant may be added to the composition, if desired, to enhance its surface wetting properties. While some repellency properties can generally be achieved by applying the aqueous dispersions within 48 hours of dilution of the composition in water, optimum repellency properties can generally be achieved when the aqueous dispersion is applied within 24 hours, preferably, 12 hours, of dilution. Other conventional additives, e.g., inorganic fillers such as silica, ultraviolet stabilizers, colorants, algicides, antioxidants, fungicides, etc., can optionally be included in the composition or dispersion.

The treatment composition can be used to impart a balance of both water- and oil-based repellency properties to porous substrates, e.g., concrete, wood, masonry, and textiles, and to non-porous substrates, e.g., plastic films, glass, and metals. Substrates can be treated with the composition by applying a sufficient amount of the composition to at least a portion of at least one surface of the substrate to produce the desired cleanability and repellency properties. Preferably, the composition is applied as a 10–20 percent (by weight) solids dispersion at a coverage rage of from about 3 to about 7.2 m²/L (1 gallon per 125 to 300 square feet). After application, the composition generally penetrates the substrate (if porous), with evaporation of any added water or solvent. The composition can be applied and allowed to cure (i.e., to form a polysiloxane material which resists re-dispersion in water) under ambient temperature conditions, although elevated temperatures, e.g., temperatures ranging up to about 120°–150 ° C., can also be utilized. The composition is especially useful for protecting concrete surfaces, particularly concrete floors, which are .subjected to oil- and water-based spills.

Objects and advantages of this invention are further illustrated by the following examples, but the particular materials and amounts thereof recited in these examples, as well as other conditions and details, should not be construed to unduly limit this invention.

EXAMPLES

Test Procedures

Two-inch cast mortar test cubes (ASTM C109) were obtained from Masonry Test Block Co., Saginaw, Mich. The blocks were placed in a forced-air oven at 100° C. overnight, then allowed to cool to room temperature before use. Blocks were treated with fluorine-containing alkoxysiloxane by first diluting a treatment composition (hereinafter, a concentrate) to the desired level in water (generally 10–20 weight percent) and applying the resulting emulsion by brushing to saturate the block surface. Three coats were generally applied, allowing the block to dry partially in between coats. This gave coverage equivalent to approximately 3–3.6 $m^2/L$ (125–150 sq ft/gal) emulsion. The coatings were allowed to dry and cure in air at room temperature for at least seven days before evaluation.

Oil stain resistance was determined by placing drops of test liquids on treated blocks, allowing the drops to stand for 6 hours, removing excess oil by absorption into paper towels, and scrubbing the blocks with a soft brush under a tap water stream. After drying, the blocks were then rated for stain resistance according to the following qualitative scheme, by comparison with untreated control blocks.

0=Equivalent to untreated control-dark stain, severe spreading of oil drop
1=Dark stain, some spreading
2=Dark stain, little or no spreading
3=Medium stain, no spreading
4=Light stain, no spreading
5⁻=Faint shadowing
5=No visible staining Oils used in this testing included: used SAE-30 motor oil; 3:1 (weight/weight) used motor oil:kerosene; automatic transmission fluid; DOT-3 brake fluid; and power steering fluid.

Water resistance was measured by determining static water holdout according to the NCHRP-244 test standard described in the National Cooperative Highway Commission Report (NCHRP) Number 244, Series 11, available from the Transportation Research Board, National Academy of Sciences, 2101 Constitution Avenue, N.W., Washington, D.C. 20418. In this test, tared treated and untreated (control) blocks were soaked under water and weighed after 21 days of immersion. Results were expressed as the percentage of water absorbed by the control blocks which was held out of the treated blocks. Triplicate samples were run and the results averaged. Higher values indicate better performance. Thus, a rating of 80 indicates that the treated block absorbed only 20% of the amount of water absorbed by an untreated control block, whereas a rating of 0 indicates that the treated block showed the same amount of water uptake as an untreated control.

Coating penetration was measured by splitting a coated block and spraying the split faces with water. This darkened the entire block face except for a hydrophobic band around the circumference which stayed light in color. The thickness of this band was recorded as the coating penetration.

In the following examples, all amounts are expressed as parts by weight unless otherwise noted. In Examples 1, 4, 5, 6, and 7, the reaction of component (c) with components (a) and (b) (or component (ab)) was confirmed by Si-29 nuclear magnetic resonance (NMR) spectroscopy.

EXAMPLE 1

A concrete treatment concentrate was prepared by mixing one part silane 1 (structure shown below; which can be prepared as described in U.S. Pat. No. 5,274,159 (Pellerite et al.)) and two parts Wacker Veoceal™ VP2100 resin (available from Wacker Silicones, Adrian, Mich.; a solvent-free organopolysiloxane microemulsion concentrate containing ethyl silicate and acetic acid as additives). The mixture of these two components was cloudy initially but clarified within a few minutes.

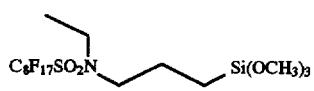

After standing overnight at room temperature, the concentrate was diluted to 15 weight percent in deionized water and shaken to give a translucent microemulsion. This microemulsion was applied and cured on masonry blocks as described above. Evaluation in the oil stain test gave ratings of 5 (no visible staining) for all of the oils, while untreated control blocks and blocks treated with a 15 weight percent microemulsion of VP2100 alone gave 0 (dark staining, much spreading). Block penetration was found to be 0.5–0.75 mm, and the static water soak test showed water holdout of 70 weight percent (58 weight percent for VP2100 alone). The microemulsion was observed over a period of several days and found to be stable with respect to viscosity increase, gelling, phase separation, and formation of precipitate. When it was allowed to age at room temperature before application to concrete blocks, the same level of performance in the oil stain test was found up to at least 24 hours emulsion aging; however, block penetration by the resulting coating decreased as the emulsion aged.

When the concentrate was allowed to age for two or more months at room temperature before diluting into water, stable, translucent microemulsions were still obtained. However, blocks treated with fresh emulsions of this aged concentrate showed reduced oil stain resistance performance relative to that obtained with emulsions of fresh concentrate. This reduced performance was manifest in lower stain ratings (2–4) after the standard 6 hour dwell in the oil droplet test, although oil could still be removed with no staining after shorter dwell times (less than 3 hours or so). Thus, significant oil stain resistance was still found on blocks treated with fresh emulsions of aged concentrate, although not as good as that observed with fresh concentrate.

Immediate dilution of the clarified fresh concentrate (no aging) into water at 15 weight percent gave upon shaking a cloudy, unstable macroemulsion which showed phase separation within about 30 minutes; however, if the concentrate was allowed to age about 4 hours or more at room temperature before diluting into water, dilution to 15 weight percent in water and shaking gave a translucent microemulsion which showed good stability when observed over a period of several days.

EXAMPLE 2

Silane 2 (structure shown below) was prepared essentially as described in U.S. Pat. No. 5,274,159 (Pellerite et al.) by reaction of 3-aminopropyl-trimethoxysilane (available from Aldrich Chemical Co., Milwaukee, Wis.) and methyl perfluorooctanoate (available from PCR, Inc., Gainesville, Fla.)

A concrete treatment concentrate was prepared by mixing one part silane 2 with two parts Wacker Veoceal™ VP2100. The resulting mixture was shaken and clarified within a few seconds, and was allowed to stand overnight at room temperature.

$$C_7F_{15}CONH \diagdown \diagup Si(OCH_3)_3 \quad\quad 2$$

A sample of the mixture was diluted to 15 weight percent in deionized water and shaken to give a translucent microemulsion which showed no separation or precipitation after observation for several days. Concrete test cubes treated with this fresh microemulsion and evaluated in the oil stain test gave ratings of $5^-$ for motor oil and motor oil/kerosene, and 5 for transmission, brake, and power steering fluids. A second, similar evaluation of this concentrate after allowing it to age for one month at room temperature gave ratings of 5 for all oils tested. Block penetration by the coating was 0.75 mm. These treated blocks also showed no darkening after 30 seconds exposure to mineral spirits, the liquid simply sitting on the block surface. In contrast, a block treated with an emulsion of VP2100 alone showed instantaneous darkening and absorption of mineral spirits.

EXAMPLE 3

A concrete treatment concentrate was prepared by mixing one part silane 3 (structure shown below; which can be prepared as described in U.S. Pat. No. 5,274,159 (Pellerite et al.)) with two parts Wacker Veoceal™ VP2100. The resulting mixture was shaken, and clarified almost instantly. After aging the concentrate for several hours at room

$$\begin{array}{c} CH_3 \\ | \\ C_4F_9SO_2N \diagdown \diagup Si(OCH_3)_3 \end{array} \quad\quad 3$$

temperature, a sample of the concentrate was diluted to 15 weight percent in deionized water. Shaking gave an almost transparent microemulsion which was coated on a masonry test cube. After curing for nine days at room temperature, evaluation in the oil stain resistance test gave ratings of 5 for all oils tested.

EXAMPLE 4

A concrete treatment concentrate was prepared by mixing one part of silane 1 with one part of Dow Corning's DC1-6184 water repellent (available from Dow Corning, Midland, Mich.; a mixture of methoxy-functional aminosilsesquioxanes). Upon mixing and shaking, the resulting mixture was cloudy but clarified within 2 hours at room temperature. This mixture could be diluted to 15 weight percent in water simply by shaking to yield a white, slightly translucent emulsion with a pronounced blue tinge. Addition of 1 weight percent glacial acetic acid to this emulsion followed by gentle agitation gave an almost transparent microemulsion. These fresh aqueous dilutions were coated separately on masonry test cubes and allowed to cure at room temperature for at least seven days. Evaluation in the oil stain resistance test gave ratings of 5 for both coatings with all oils tested. Coating penetration for these systems was found to be on the order of 0.5 mm.

EXAMPLE 5

A concrete treatment concentrate was prepared by mixing one part silane 1, one part isobutyl-trimethoxysilane (available from Aldrich Chemical Co.), and two parts DC1-6184. The resulting mixture was aged for one month at room temperature. Then, a 15 g sample of the aged mixture was mixed with 2 g glacial acetic acid. After the resulting exotherm had subsided, 83 g deionized water was added and the mixture was shaken to yield a slightly translucent emulsion. This emulsion was coated on test cubes at emulsion ages of 0 and 1 hour, and the coatings were allowed to dry and cure for ten days at room temperature. Evaluation in the oil stain resistance test gave ratings of 5 for all oils tested on the coatings prepared from fresh emulsion. For the 1 hour emulsion, ratings were: motor oil, $5^-$; motor oil/kerosene, 3; transmission fluid, 5; brake fluid, 5; power steering fluid, 4.

This concentrate was re-evaluated after storage for 11 months at room temperature. A 1.5 g sample was shaken with 8.5 g deionized water to give a milky emulsion, followed by immediate addition of 0.2 g glacial acetic acid. After shaking, the mixture was a translucent microemulsion which showed no phase separation, precipitation, or gelation when observed over a period of 3 days at room temperature.

EXAMPLE 6

One part silane 1 was mixed with one part Wacker Veoceal™ VP1311 (available from Wacker Silicones) and shaken to give a clear concentrate. Veoceal™ VP1311 is a solvent-free silicone microemulsion concentrate containing isooctyltrimethoxysilane, ethyl silicate, oligomeric alkylalkoxysiloxane, acetic acid, and methanol (hydrolysis by-product). The resulting concentrate, after aging for three days at room temperature, did not produce a stable emulsion when diluted into water at 15 weight percent. However, two parts of this concentrate could be blended with one part Wacker Veoceal™ VP2100, the mixture shaken, and immediately diluted to 15 weight percent in deionized water to yield a stable, translucent microemulsion. This microemulsion was used to coat masonry test cubes for the oil stain resistance test, yielding ratings of 5 for all oils tested. Penetration was found to be 0.5–1.0 mm, and the static water soak test showed 66 percent holdout after 21 days. This compares favorably with 63 percent observed for VP1311 alone, and 58 percent for VP2100 alone. A repeat of the oil stain test using concentrate that had aged for several months at room temperature before blending with VP2100 and diluting into water gave ratings of $5^-$ for motor oil and used motor oil/kerosene, and 5 for transmission, brake, and power steering fluids. Thus, this two-part concentrate system showed enhanced shelf life relative to that of the concentrate of Example 1.

EXAMPLE 7

A mixture of one part silane 1 and one part Wacker Veoceal™ VP1311 was stored at room temperature for three months. The resulting concentrate was diluted into water to 10 weight percent and shaken to produce an emulsion which showed only a trace of phase separation after three days at room temperature. Application of the fresh emulsion to masonry test cubes and evaluation in the oil stain test gave ratings of $5^-$ for motor oil and motor oil/kerosene, and 5 for transmission, brake, and power steering fluids.

Comparative Example 1

Dispersions 1a and 2a were prepared essentially as described in Examples 1 and 2 of European Patent Publication No. 0 561 708 A2 (Minnesota Mining & Manufacturing Company), the descriptions of which are incorporated herein by reference. The resulting milky, opaque emulsions showed pronounced phase separation within several hours after mixing. Masonry test cubes treated with these emulsions and cured for seven days at room temperature showed resistance to staining by mineral oil in a 5-minute dwell test as described in the above patent publication, but significant staining in the 6 hour oil stain resistance test utilized herein. Results from these tests appear in the table below.

| | Stain Test Ratings | | | | |
|---|---|---|---|---|---|
| Dispersion | Motor Oil/ Kerosene | Motor Oil | Transmission Fluid | Brake Fluid | Power Steering Fluid |
| 1a | 1 | 1 | 4 | 0 -- Immed. wetting | 1 |
| 2a | 2 | 1 | 3 | 0 -- Immed. wetting | 1 |

Comparative Example 2

A concrete treatment concentrate was prepared by mixing one part silane 4 (structure shown below; available from PCR Inc.) with two parts Wacker Veoceal™ VP2100. The resulting clear liquid was allowed to stand overnight at room temperature, then was diluted to 15 weight percent in deionized water and shaken to give a translucent microemulsion. This microemulsion was applied while fresh to masonry test cubes as

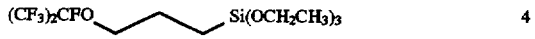

$(CF_3)_2CFO\_\_\_\_\_Si(OCH_2CH_3)_3$     4 described in the Test Procedures above, allowed to cure for seven days at room temperature, and evaluated in the oil stain resistance test. Ratings of 0 were observed with all five liquids; all oils had soaked into the samples by the end of the six-hour dwell. In addition, transmission, brake, and power steering fluids gave immediate wetting and darkening when the drops were placed on the blocks.

Comparative Example 3

Concentrate A was prepared by mixing one part silane 5 (structure shown below; available from Gelest, Inc., Tullytown, Pa.) and two parts Wacker Veoceal™ VP2100. Concentrate B was prepared by mixing 5.98 parts silane 5 and 4.02 parts Wacker Veoceal™ VP2100. The latter concentrate is of interest in this comparative example because it contains the same weight percent fluorine as the concentrate of Example 1. The resulting clear liquids were allowed to stand overnight at room temperature, then diluted to 15 weight percent

$CF_3\_\_\_\_Si(OCH_3)_3$     5 in deionized water and shaken to give translucent microemulsions. These microemulsions were applied separately while fresh to masonry test cubes as described above, allowed to cure at least seven days at room temperature, and evaluated in the oil stain resistance test. The ratings were as shown in the table below. Although Concentrate B performed well with motor oil and motor oil/kerosene, significant staining was noted for both concentrates with the other three test liquids.

| | Stain Test Ratings | | | | |
|---|---|---|---|---|---|
| Concentrate | Motor Oil/ Kerosene | Motor Oil | Transmission Fluid | Brake Fluid | Power Steering Fluid |
| A | 3 | 2 | 1 | 2 | 1 |
| B | 5⁻ | 5 | 2 | 2 | 2 |

Comparative Example 4

A mixture of 1 g silane 6 (structure shown below; obtained from Shin-Etsu Chemical Co., Ltd., Tokyo, Japan) and 1 g DC1-6184 was prepared in a small screw-top vial. In another vial, 0.82 g silane 6 and 1.18 g DC1-6184 were charged. The latter mixture contained the same weight percent fluorine as that of the concentrate of Example 4. The vials were agitated at room temperature on a roller. Unlike the material in Example 4 which clarified completely within 2 hours, both of these mixtures were two-phase liquids even after 14 days and were not appropriate for use as water-dilutable concentrates.

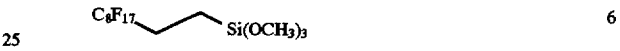

$C_8F_{17}\_\_\_\_Si(OCH_3)_3$     6

EXAMPLE 8

A mixture of one part silane 6 and two parts Wacker Veoceal™ VP2100 was prepared and agitated at room temperature for two days, after which time the initially cloudy liquid was seen to have clarified. This liquid concentrate was diluted to 15 weight percent in deionized water and shaken to give a translucent microemulsion. Concrete test cubes treated with this fresh microemulsion, allowed to cure at room temperature, and evaluated in the oil stain test as described above gave ratings of 5⁻ for motor oil/kerosene, 4 for motor oil, and 5 for transmission, brake, and power steering fluids.

Various modifications and alterations of this invention will become apparent to those skilled in the art without departing from the scope and spirit of this invention.

We claim:

1. A self-emulsifying, liquid treatment composition for rendering substrates both water- and oil-repellent comprising the polysiloxane reaction product of (a) at least one alkoxysilane, alkoxysiloxane, or siloxane compound comprising at least one hydrophobic moiety selected from the group consisting of alkyl, aryl, aralkyl, and alkaryl moieties; (b) at least one alkoxysilane, alkoxysiloxane, or siloxane compound comprising at least one hydrophilic moiety selected from the group consisting of protonated and unprotonated azaalkyl and silyl-containing azaalkyl moieties; and/or c) at least one fluorine-containing alkoxysilane compound represented by the average general formula:

$[R_f-Z-R^5]_{h'}Si(R^2_{h''})(OR^2)_{4-h'-h''}$ wherein each $R_f$ is independently a perfluoroalkyl group having at least four carbon atoms and optionally containing one or more catenary ether oxygen atoms; each $R^5$ is independently selected from the group consisting of alkylene groups having from 2 to about 11 carbon atoms, arylene groups having from 6 to about 10 carbon atoms, and alkarylene groups having from 7 to about 16 carbon atoms; each $R^2$ is independently an alkyl group having from 1 to about 4 carbon atoms; h' is an integer of 1 or 2; h'' is an integer of 0 or 1; the sum of h' and h" is less than or equal to 2; and each Z is independently a divalent moiety selected from the group consisting of a covalent bond, —(CH$_2$)$_n$S—, —(CH$_2$)$_{n+1}$NR$^2$—, —(CH$_2$)$_n$SO$_2$NR$^3$—, —(CH$_2$)$_n$C(=O)NR$^3$—, —(CH$_2$)$_n$SO$_2$NR$^2$CH$_2$CH$_2$O(C=O)CH$_2$CH$_2$NR$^3$—, and —(CH$_2$)$_n$O—, where n is an integer of 0 to about 5, n' is an integer of 1 to about 5, R$^2$ is an alkyl group having from 1 to about 4 carbon atoms, and R$^3$ is selected from the group consisting of hydrogen and alkyl groups having from 1 to about 4 carbon atoms with the provision that Z is not a covalent bond when R$^5$ is alkylene.

2. The composition of claim 1 wherein components (a) and (b) are replaced with at least one alkoxysilane, alkoxysiloxane, or siloxane compound comprising at least one said hydrophobic moiety and at least one said hydrophilic moiety.

3. The composition of claim 2 wherein said compound is represented by the average general formula:

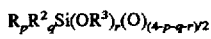

wherein each R is independently selected from the group consisting of R$^1$ and R$^4$, wherein R$^1$ and R$^4$ are as defined above in claims 6 and 9, respectively; R$^2$ and R$^3$ are as defined above in claim 6; p is an integer of 1 or 2; q is an integer of 0 or 1; r is a number from 0 to about 3; and the sum of p, q, and r is less than or equal to 4.

4. The composition of claim 1 wherein said hydrophobic moiety is selected from the group consisting of alkyl groups having from 1 to about 12 carbon atoms, phenyl, benzyl, phenethyl, and alkylphenyl.

5. The composition of claim 1 wherein said compound comprising at least one hydrophobic moiety is represented by the average general formula:

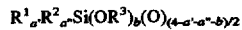

wherein each R$^1$ is independently an alkyl group having from 1 to about 12 carbon atoms; each R$^2$ is independently an alkyl group having from 1 to about 4 carbon atoms; each R$^3$ is independently selected from the group consisting of hydrogen and alkyl groups having from 1 to about 4 carbon atoms; a' and a" are independently integers of 0, 1, or 2, with the proviso that the sum of a' and a" is equal to 1 or 2; b is a number from 0 to about 3; and the sum of a', a", and b is less than or equal to 4.

6. The composition of claim 5 wherein said compound is selected from the group consisting of methyltrimethoxysilane, isobutyltrimethoxysilane, isooctyltrimethoxysilane, and partial condensates thereof.

7. The composition of claim 1 wherein said hydrophilic moiety is selected from the group consisting of protonated and unprotonated mono- and diazaalkyl groups having from about 3 to about 12 carbon atoms.

8. The composition of claim 1 wherein said compound comprising at least one hydrophilic moiety is represented by the average general formula:

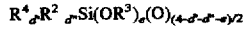

wherein each R$^4$ is independently a protonated or unprotonated azaalkyl or silyl-containing azaalkyl group having from about 3 to about 12 carbon atoms; d' is an integer of 1 or 2; d" is an integer of 0 or 1; e is a number from 0 to about 3; the sum of d' and d" is equal to 1 or 2; the sum of d', d", and e is less than or equal to 4; and R$^2$ and R$^3$ are as defined above.

9. The composition of claim 8 wherein said azaalkyl group is protonated.

10. The composition of claim 8 wherein said compound is selected from the group consisting of 3-aminopropyltrimethoxysilane, N-[2-aminoethyl]-3-aminopropyltrimethoxysilane, and their partial condensates.

11. The composition of claim 1 wherein said perfluoroalkyl group has from about 6 to about 16 carbon atoms.

12. The composition of claim 1 wherein said compound is selected from the group consisting of N-(3-trimethoxysilylpropyl)-N-ethyl-perfluorooctanesulfonamide and N-(3-trimethoxysilylpropyl)perfluorooctanecarboxamide.

13. The composition of claim 1 wherein said polysiloxane reaction product is represented by the average general formula:

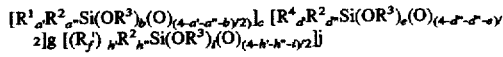

wherein R$_f'$ is F$_f$—Z—R$^5$—, where R$_f$, Z, and R$^5$ are as defined above in claim 13; R$^1$, R$^2$, R$^3$, R$^4$, a', a", b, d', d", e, h', and h" are as defined above in claims 6, 9, and 13; i is a number from 0 to about 3; and c, g, and j are independently numbers from about 1 to about 50, with the proviso that (c+j)/g is greater than 1 and that c/j ranges from 1 to about 10; wherein the sums a'+a"+b, d'+d"+e, and h'+h"+i are each less than or equal to 3, and wherein the average number of alkoxy groups (OR$^3$) per silicon atom is between about 0.5 and about 2.5.

14. The composition of claim 1 further comprising unreacted fluorine-containing alkoxysilane compound.

15. The composition of claim 1 wherein the fluorine content of said composition ranges from about 5 to about 30 weight percent.

16. The composition of claim 1 further comprising water.

17. The composition of claim 1 further comprising at least one solvent.

18. An article comprising a substrate bearing on at least a portion of at least one surface thereof the composition of claim 1.

19. An article comprising a substrate bearing on at least a portion of at least one surface thereof the composition of claim 1 in cured form.

20. A process for protecting substrates from water- and oil-based challenges comprising the steps of (a) applying the composition of claim 1 to at least a portion of at least one surface of a substrate; and (b) allowing said composition to cure.

21. A self-emulsifying, liquid treatment composition for rendering substrates both water- and oil-repellent comprising the polysiloxane reaction product of (a) at least one alkoxysilane, alkoxysiloxane, or siloxane compound comprising at least one hydrophobic moiety selected from the group consisting of methyl and isooctyl; (b) at least one alkoxysilane, alkoxysiloxane, or siloxane compound comprising at least one protonated N-2-aminoethyl-3-aminopropyl moiety; and (c) N-(3-trimethoxysilylpropyl)-N-ethyl-perfluorooctanesulfonamide.

22. A self-emulsifying, liquid treatment composition for rendering substrates both water- and oil-repellent comprising the polysiloxane reaction product of (a) at least one alkoxysilane, alkoxysiloxane, or siloxane compound comprising at least one hydrophobic moiety selected from the group consisting of methyl and isooctyl and at least one protonated N-2-aminoethyl-3-aminopropyl moiety; and (b) N-(3-trimethoxysilylpropyl)-N-ethyl-perfluorooctanesulfonamide.

* * * * *